(12) United States Patent
Bezares Sánchez

(10) Patent No.: US 10,708,493 B2
(45) Date of Patent: Jul. 7, 2020

(54) PANORAMIC VIDEO

(71) Applicant: Diego Bezares Sánchez, Madrid (ES)

(72) Inventor: Diego Bezares Sánchez, Madrid (ES)

(73) Assignee: Diego Bezares Sánchez, Madrid (ES)

( * ) Notice: Subject to any disclaimer, the term of this patent is extended or adjusted under 35 U.S.C. 154(b) by 7 days.

(21) Appl. No.: 15/711,142

(22) Filed: Sep. 21, 2017

(65) Prior Publication Data

US 2019/0089897 A1    Mar. 21, 2019

(51) Int. Cl.
*G09B 9/02* (2006.01)
*G06G 7/72* (2006.01)
*H04N 5/232* (2006.01)
*H04N 5/262* (2006.01)

(52) U.S. Cl.
CPC ..... *H04N 5/23238* (2013.01); *H04N 5/23229* (2013.01); *H04N 5/2621* (2013.01)

(58) Field of Classification Search
CPC ........... H04N 5/23238; H04N 5/23229; H04N 5/2621
USPC .......................................................... 348/36
See application file for complete search history.

(56) References Cited

U.S. PATENT DOCUMENTS 3,580,978 A * 5/1971 Ebeling ................. G09B 9/32
348/123
2013/0278713 A1* 10/2013 Banks ................... G01S 7/4816
348/36

OTHER PUBLICATIONS support.video-stitch.com/hc/en-us/community/posts/211167728-What-is-parallax-Howdoes-it-impact-360-video-output.
www.kolor.com/wiki-en/action/view/Autopano_Video_-_Parallax.
developers.google.com/vr/jump/rendering-ods-content.pdf.

* cited by examiner

*Primary Examiner* — Hee-Yong Kim
(74) *Attorney, Agent, or Firm* — Tristan A. Fuierer; Olive Law Group, PLLC

(57) ABSTRACT

A panoramic video system obtains a digital video image having a width $w_1$ pixels and a height of h pixels. A plurality of digital still images is also obtained, each still image comprising a ray having a width $w_2$ comprising pixels, $1 \leq w_2 \leq 50$, a height substantially equal to h. A storage device records or a display device displays the digital video image and plurality of digital still images. The set of n rays on either or both sides of the first horizontal angle is obtained from the plurality of still images to form one or two still background images, adjacent horizontally to the digital video image, each of the background image(s) having a width of $n \cdot w_2$ and a height substantially equal to h, and each ray forming one vertical stripe of the still background image.

16 Claims, 4 Drawing Sheets

PANORAMIC VIDEO

FIELD OF THE INVENTION

The present invention relates to methods and systems for capturing and/or displaying panoramic video.

BACKGROUND OF THE INVENTION

Stitching processes are known in the art, and comprise combining (or merging) digital fractional images (or videos, i.e, sequences of images), each one covering a fractional angle of vision, to produce digital panoramic images (or videos) covering a wider angle of vision (that is, bigger than the angle of vision covered by a single digital fractional image or video). In order to produce said digital panoramic images (or videos), it is necessary that the angle of vision of each digital fractional image (or video), partially overlaps with the angle of vision of at least another digital fractional image (or video).

Stitching processes are usually used with:
a) photographic digital images, in which case two or more fractional photographic images—with fractional and partially overlapping angles of vision—are merged to produce a single panoramic digital image; and
b) with digital video sequences, in which case two or more video sequences of digital fractional images, with fractional and partially overlapping angles of vision, are merged to produce a panoramic video sequence;

Digital images are formed by a fixed number of rows and columns of pixels. Pixels are the smallest individual elements (or dots) in an image, holding values that represent the color values (for example, color, brightness and saturation) of a given color at a specific point of said digital image. On the other hand, video sequences are, merely, sequences of digital images, each image comprising the same fixed number of rows and columns of pixels.

Panoramic images (or videos) obtained with said stitching process are (preferably but not necessarily) 360° panoramic images (or videos). In fact, stitching is a common technique used by most 360° camera manufacturers.

The most common stitching processes known in the art, essentially comprise the following steps:
i) obtaining the digital fractional images, which cover fractional and partially overlapping angles of vision; or alternatively obtaining the digital fractional video sequences, which cover fractional and partially overlapping angles of vision;
ii) calibrating the digital fractional images, in order to reduce exposure and chromatic differences between adjacent digital fractional images; or alternatively calibrating the video sequences of digital fractional images, in order to reduce exposure and chromatic differences between digital fractional video sequences;
iii) finding correspondences between adjacent digital fractional images; or alternatively finding correspondences between digital fractional video sequences;
iv) modifying the digital fractional images, in view of the correspondences found in the step above, for improving the alignment between adjacent digital fractional images; or alternatively modifying the digital fractional video sequences, in view of the correspondences found in the step above, for improving the alignment of digital fractional video sequences;
v) aligning adjacent digital fractional images together and making them fit into a predefined compositing surface (or projection), to form a digital panoramic image; or alternatively aligning digital fractional video sequences together and making them fit into a predefined compositing surface (or projection), to form a panoramic video sequence; and
vi) blending the adjacent digital fractional images which form the digital panoramic image in order to minimize seams (i.e., errors or imperfections existing in the overlapping areas of adjacent digital fractional images); or alternatively blending the digital fractional video sequences which form the digital panoramic video sequence in order to minimize seams.

Some prior art stitching processes contemplate, in the correspondence finding step iii) mentioned above, the use of different already-known "feature detection" algorithms, such as corners algorithms, blobs algorithms, Harris corners algorithms or DoG algorithms (difference-of-Gaussian algorithms).

Some prior art stitching processes contemplate, in the modification step iv) mentioned above, modifications such as pure rotation, pure translation, scaling of the digital fractional images (or alternatively of the sequences of the digital fractional images), and combinations thereof.

Most of prior art stitching processes contemplate, in the aligning step v) mentioned above, selecting a substantial part of each digital fractional image (usually 40% of the rows and columns of pixels forming each fractional image, or more) to form the digital panoramic image (or video).

In order to reduce seams, most of the substantial part of each fractional image/sequence of images usually selected by prior art stitching processes to form the panoramic image/sequence of images, corresponds to the non-overlapping angle of vision thereof.

Some projections employed in the aligning step (step v mentioned above) of stitching processes according to prior art, are rectilinear, cylindrical and spherical.

Some prior art stitching processes contemplate, in the blending step vi) mentioned above, minimizing the intensity difference of overlapping pixels, corresponding to adjacent digital fractional images (or videos).

The above-mentioned stitching processes of the prior art, work properly when all the partial images (or videos) are taken from the same position (called the non-parallax point). In other words, said classic stitching processes are capable of merging all the partial images (videos) seamlessly, even with camera rotations between the shots.

Nevertheless, if the partial images are taken from different positions (i.e., with parallax), errors such as discontinuities could occur when using said classic stitching process.

In fact, references to this technical problem can be found in dedicated forums, and even in the web pages of some of the leading companies of the sector. For example, the following statement could be found in the official forum of the Company VideoStitch Inc.: "Parallax introduces stitching errors, making seams more visible after stitching, usually on objects close to the camera". "It's impossible to remove it entirely, but there are different ways to reduce if". More information could be found in the following web site: «support.video-stitch.com/hc/en-us/community/posts/211167728-What-is-parallax-Howdoes-it-impact-360-video-output»

Further explanations of the stitching errors due to parallax can also be found, for example in the Kolor (commercial name) web site, the stitching software developed by the company GoPro Inc., «www.kolorcom/wiki-en/action/view/Autopano_Video_-_Parallax».

Therefore, there is a need for providing a method capable of correctly merging fractional images (or videos) taken from different positions (with parallax). In particular, in order to obtain stereoscopic images or videos, it is necessary to record fractional images with parallax.

Stereoscopic images (or videos) comprise two images (two sequences of images in the case of videos), one for each eye. The parallax between the two images (between the two sequences of images, in the case of videos) allows the human brain to distinguish depth (i.e., see in 3D). More particularly, nearby objects have greater shift in image position between left and right eyes than far away objects. Consequently, in order to record a stereoscopic image or video, it is not enough to record from a single point, but it is necessary to move the cameras (or to have a multi-camera system) that records this necessary parallax.

Consequently, some stitching processes, intended to form a digital panoramic image (or alternatively, a digital panoramic video sequence) from digital fractional images (or alternatively from digital fractional video sequences) obtained by a rotation of cameras with parallax, have been recently developed in the art.

One example of said recently implemented stitching processes capable of merging fractional images taken with parallax, is the ODS (omni-directional stereo) projection. described in the following web site:

«developers.google.com/vr/jump/rendering-ods-content-.pdf»

In order to avoid seam problems associated to the stitching of partial images taken with parallax, said ODS projection selects, during the alignment step, just the central ray of each digital fractional image, to form the digital panoramic image, instead of selecting a substantial part of each partial image/sequence of partial images.

Throughout the present description, it should be understood that a "ray" of a digital image is the set of all digital information corresponding to a particular horizontal direction of said digital image. In other words, a ray of a digital image consists in all the digital information coming from all vertical angles, but corresponding to the same horizontal angle. Consequently, a ray of a digital image is a particular vertical column of said digital image, said vertical column having a width of 50 pixels, or less.

ODS projection is capable of forming digital 360° panoramic stereoscopic images, but it is not capable of forming digital panoramic stereoscopic videos by using just two real (physical) recording video cameras and was not even conceived for that purpose. In fact, it is impossible to use—in practice—the ODS projection with real video cameras, since it would be necessary that a great number of different cameras ((i.e., several hundreds, even thousands) to record video simultaneously. And this unthinkable is in terms of costs and physical space.

In addition, no prior art stitching processes, including ODS algorithm, is capable of forming a seamless digital panoramic video by combining a separate digital fractional video sequence covering a predefined angle of vision with a set of digital fractional images taken at other time, and covering the remaining angle of vision.

The stitching process according to the present invention is intended to address the problems and disadvantages of the prior art, mentioned above.

BRIEF DESCRIPTION OF THE INVENTION

A first object of the present disclosure is an imaging system comprising:
a first imaging system operable to obtain a digital video image having a first width and a height, the first width comprising $w_1$ pixels and a first horizontal viewing angle, the height comprising h pixels and a first vertical viewing angle;
a second imaging system operable to obtain a plurality of digital still images, each still image comprising a ray, the ray having a second width and substantially the same height as the digital video image, the second width comprising $w_2$ pixels, $1 \leq w_2 \leq 50$, and a second horizontal viewing angle; and
a storage device operable to record said digital video image and said plurality of digital still images, or a display device operable to display said digital video image and said plurality of digital still images;
wherein said second imaging system is aligned and operable to obtain a set of n rays on either or both sides of the first horizontal viewing angle, the set of rays forming one or two still background images adjacent horizontally to the digital video image, the background image(s) having substantially the same vertical viewing angle as the first vertical viewing angle, where the width of each still background image is $n \cdot w_2$ and each ray forms one vertical stripe of the still background image.

In a preferred embodiment of the imaging system according to the present invention, the set of rays forms one background image extending from one side of the digital video image to the other side of the digital video image such that a 360° panoramic image is produced, the 360° panoramic image comprising the digital video image and the one background image covering all angles not included in the first horizontal viewing angle.

In another preferred embodiment of the imaging system according to the present invention, the second imaging system is the same as the first imaging system.

In other preferred embodiment of the imaging system according to the present invention, the second imaging system is operable to obtain the set of rays forming the background image(s) as follows:
a) Taking a first digital still image, horizontally adjacent to a first edge of the digital video image,
b) Selecting a first ray from the first still image, said first ray having a width $w_2$, and corresponding to the area of the first still image which is immediately adjacent to said first edge of the digital video image, and out of the angle of vision covered by said digital video image;
c) Selecting a second ray from the second still image, said second ray having a width $w_2$, and corresponding to the area of the second still image which is immediately adjacent to the first ray and out of the angle of vision already covered by the first ray;
d) Repeating step c) with the remaining digital still images, until a last ray is selected from the last digital still image, said last ray having a width $w_2$, and corresponding to the area of the last digital still image which is immediately adjacent to a second edge of the digital video image.

In the above embodiment, the first edge of the digital video image can be, for example, the right edge, (i.e., the most right part of it). In that case, the first selected ray corresponds to the area of the first image immediately adjacent to the most right part of the video image. The second selected ray corresponds to the area of the second image immediately adjacent to the most right part of the first ray, and the last selected ray corresponds to the area of the last image immediately adjacent to the most right left of the video image (i.e. the second edge of the video image). In this case, the set of rays forming the background image(s) are selected following a clockwise motion.

Nevertheless, the present invention also contemplates the opposite possibility: the first edge of the digital video image being the left edge (i.e., the most left part of it) and the second edge being the right edge. In that case, the set of rays forming the background image(s) are selected following a counter-clockwise motion.

In other embodiment, the video imaging system according to the present invention, further comprises a third imaging system substantially similar to the first imaging system but displaced horizontally by a distance d and a fourth imaging system substantially similar to the second imaging system but displaced horizontally by the same distance, d such that stereoscopic panoramic images are recorded or displayed.

In another preferred embodiment of the video imaging system according to the present invention, the second imaging system is the same as the first imaging system and the third imaging system is the same as the fourth imaging system.

In a preferred embodiment of the video imaging system according to the present invention, the width of the rays is of 1 pixel ($w_2=1$).

A second object of the present invention is a method for capturing panoramic video comprising:
  capturing a first digital video image with a first imaging system, the digital video image having a first width and a height, the first width comprising $w_1$ pixels and a first horizontal viewing angle, the height comprising h pixels and a first vertical viewing angle;
  capturing a first plurality of digital still images with a second imaging system, each still image comprising a ray, the ray having a second width and substantially the same height as the first digital video image, the second width comprising $w_2$ pixels, $1 \leq w_2 \leq 50$, and a second horizontal viewing angle; and recording said first digital video image and said plurality of digital still images on a storage device, or displaying said digital video image and said first plurality of digital still images on a display device;
  wherein said digital still images comprise a set of n rays on either or both sides of the first horizontal viewing angle, the set of rays forming one or two still background images adjacent horizontally to the digital video image, the background image(s) having substantially the same vertical viewing angle as the first vertical viewing angle, where the width of each still background image is $n \cdot w_2$ and each ray forms one vertical stripe of the still background image.

In another embodiment of the method according to the invention, the set of rays forms one background image extending from one side of the first digital video image to the other side of the first digital video image such that a 360° panoramic image is produced, the 360° panoramic image comprising the first digital video image and the one background image covering all angles not included in the first horizontal viewing angle.

In other embodiment of the method according to the invention, the plurality of digital still images are captured by the first video camera.

In other preferred embodiment of the method according to the invention, the rays forming the background image(s) are obtained following these steps:
e) Taking a first digital still image, horizontally adjacent to a first edge of the digital video image,
f) Selecting a first ray from the first still image, said first ray having a width $w_2$, and corresponding to the area of the first still image which is immediately adjacent to said first edge of the digital video image, and out of the angle of vision covered by said digital video image;
g) Selecting a second ray from the second still image, said second ray having a width $w_2$, and corresponding to the area of the second still image which is immediately adjacent to the first ray and out of the angle of vision already covered by the first ray;
h) Repeating step c) with the remaining digital still images, until a last ray is selected from the last digital still image, said last ray having a width $w_2$, and corresponding to the area of the last digital still image which is immediately adjacent to a second edge of the digital video image.

Another embodiment of the method according to the invention, comprises capturing a second digital video image with a third imaging system, substantially similar to the first digital video image but displaced horizontally by a distance d and capturing a second plurality of digital still images with a fourth imaging system substantially similar to the first plurality of digital still images but displaced horizontally by the same distance d such that stereoscopic panoramic images are recorded or displayed.

However, the method according to the present invention can also be used to obtain a conventional (non-stereoscopic) digital panoramic video. In that case, only one imaging system is required to obtain the digital video image, and only a single set of digital still images should be obtained to form the still background of the panoramic video.

In a preferred embodiment of the method imaging system according to the present invention, the second imaging system is the same as the first imaging system and the third imaging system is the same as the fourth imaging system.

In a preferred embodiment of the method according to the present invention, the second width of the rays is of 1 pixel ($w_2=1$).

One embodiment of the method according to the present invention, contemplates capturing the first plurality of digital still images after the first digital video image. Another embodiment of the method according to the present invention, contemplates capturing the first plurality of digital still images before the first digital video image.

In other embodiments of the present invention the panoramic video represents an equirectangular projection of a scene, a cylindrical projection of a scene or a cubical projection of a scene.

According to the method of the present invention, usually one single ray is selected from each of the digital still images. In that cases, the number of digital still images of the plurality should be, at least, the same than the number of rays necessary to complete a background still image, completing the remaining angle of vision not covered by the digital video image. If the number of fractional digital still images of the set is bigger than the number of rays necessary to complete a background still image, the digital video image or the plurality of digital still images could be scaled accordingly.

Some embodiments of the method according to the present invention comprise steps for calibrating the plurality of digital still images and/or for calibrating the digital video image, for modifying the plurality of digital still images and/or for modifying digital video image, and/or for aligning plurality of digital still images, among them, and/or with the digital video image. Said calibrating, modifying and/or aligning steps will not be herein described in detail, since they are already known in the art.

Imaging systems which can be used with the present invention to obtain the digital video image are physical image sensors (digital video cameras such as GoPro® Cameras, sport & action video cameras, DSLR cameras (Digital Single Lens Reflex cameras) and Phantom high-speed cameras), as well as other types of sensors, like depth sensors, infrared sensors and radars.

Imaging systems which can be used with the present invention to obtain the plurality of digital still images are physical image sensors (digital photographic cameras and video cameras such as GoPro® Cameras, sport & action video cameras, DSLR cameras (Digital Single Lens Reflex cameras) and Phantom high-speed cameras), as well as other types of sensors, like depth sensors, infrared sensors and radars.

Other characteristics and advantages of the present invention will emerge from the description of the invention that follows, as well as from the embodiment illustrated in the accompanying figures.

DETAILED DESCRIPTION OF THE INVENTION

Definitions

Figure 1:
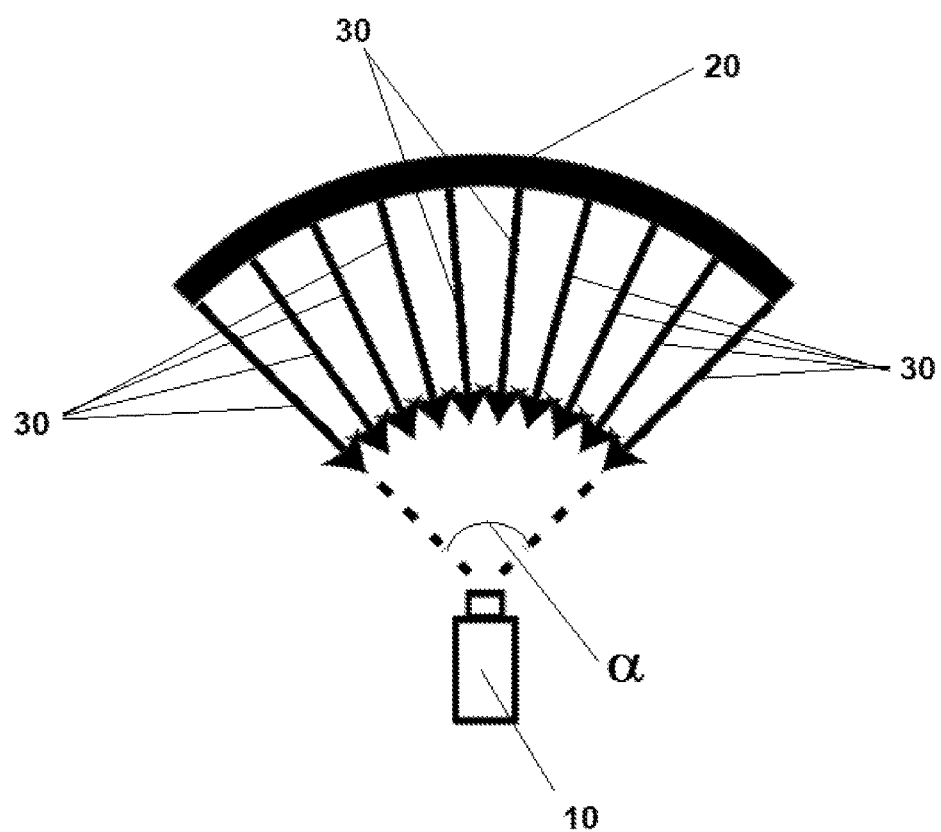
FIG. 1 shows, schematically and in a simplified way, how the digital video image is obtained by an image system in a method according to the present invention.

As used herein, the term "image" refers to any representation of a scene as captured by an imaging system. If not otherwise identified, the image is assumed to consist of a single still picture.

As used herein, the term "digital image" refers to an image recorded in digital form as a sequence of "pixels." Typically, a digital image comprises a rectangular array of approximately square pixels. Thus, the size of a digital image can be measured as having a "width" and "height" defined as a number of pixels in each of two orthogonal directions.

As used herein, the term "fractional image" refers to a portion of a larger image. For example, an image can comprise a set of horizontal portions each having a width less than that of the larger image.

As used herein, the term "video image" refers to a representation of a "moving picture" comprising a set of frames captures at sequential and equally-space time intervals. The time interval may vary, but a digital video image is typically captured at, at least, 24 or 30 frames per second. A time interval of 60 frames per second is preferred for the purposes of the present invention. As used herein, the term "panoramic image" refers generally to any image having a width significantly greater than its height. The aspect ratio can vary, but the width is typically at least twice the height. While, in principle, a panoramic image can be captured all at once by a single camera, in practice, it is common to capture a plurality of images having smaller aspect ratios and then "stitching" the plurality of images together to form a single panoramic image.

A panoramic image can be formed to represent, for example, an "equirectangular", "cylindrical" or "cubical" projection. An equirectangular projection implies a forward projection, by which spherical coordinates are transformed into planar coordinates and a map projection, by which meridians are transformed into vertical straight lines of constant spacing (for meridional intervals of constant spacing) and circles of latitude are transformed into horizontal straight lines of constant spacing (for constant intervals of parallels). A cylindrical projection implies projecting the image onto a cylinder tangent to the equator as if were coming from a light source at the center of the scene. The cylinder is then cut along one of the projected meridians and unrolled into a flat image.

As used herein, the terms "viewing angle" and "angle of vision" are used interchangeably to refer to fractions of a particular projection.

As used herein, the terms "stereo image" and "stereoscopic image" are used interchangeably and refer to a set of two images where each image is intended to be viewed by one eye such that the brain perceives an approximation of a three-dimensional scene.

As used herein, any of the above definitions can be combined in any sequence: for example, a "digital panoramic video image" is a video image that is also panoramic and digital.

As used herein, the term "ray" refers to a fractional image comprising a vertical image stripe having a width of between 1 and 50 pixels. Generally, ray widths are chosen such that there are negligible parallax mismatches between adjacent rays.

As used herein, the term "substantially the same" refers to quantities which are equal for practical purposes but may vary numerically by up to 5%.

DESCRIPTION OF THE EMBODIMENTS

Example 1

Figure 2A:
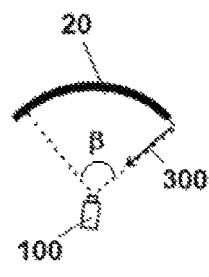
FIGS. 2a-n schematically show how the method according to the present invention obtains the set of adjacent fractional digital images and selects the appropriate rays thereof.
Figure 2B:
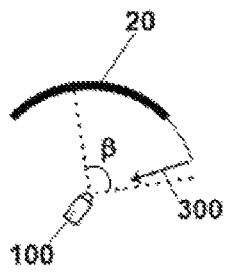
Figure 2C:
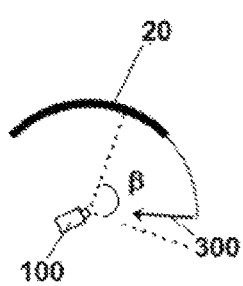
Figure 2D:
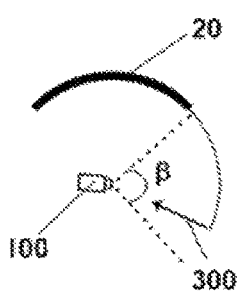
Figure 2E:
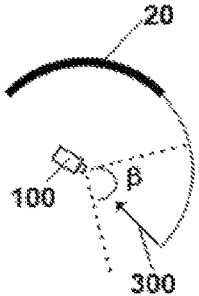
Figure 2F:
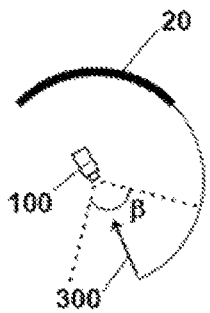
Figure 2G:
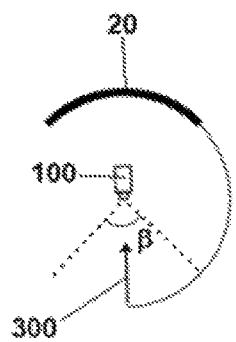
Figure 2H:
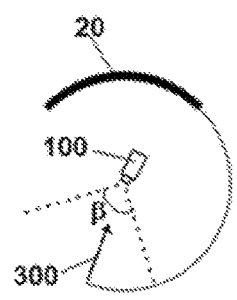
Figure 2I:
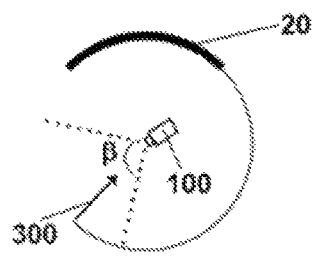
Figure 2J:
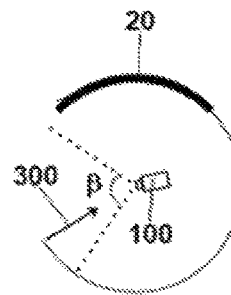
Figure 2K:
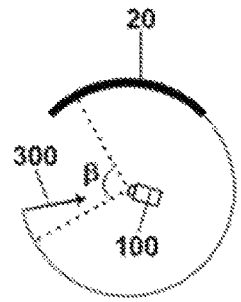
Figure 2L:
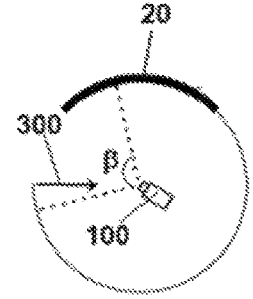
Figure 2M:
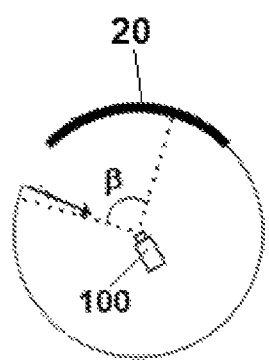
Figure 2N:
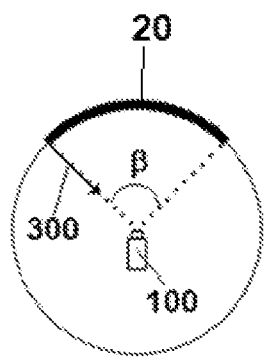

FIGS. 1 and 2a to 2n illustrate this example. In this example, a 360° stereoscopic panoramic video is obtained, having a total horizontal width of 4,320 pixels.

FIG. 1 schematically represents how an imaging system obtains a digital video image. Still digital images are obtained in a similar way. More particularly, FIG. 1 represents in a simplified way how the digital video image is obtained in a process according to the present invention.

Two different imaging systems 10 are used, each one for obtaining a digital video image for one eye, for obtaining a 360° panoramic stereoscopic video. One single imaging system 10 has been illustrated in said FIG. 1, but two different imaging systems 10 are used and the operation of each imaging system 10 is exactly the same.

As can be seen in FIG. 1, each imaging sensor 10 captures all rays 30 of light coming from a first horizontal angle α of vision, to obtain the digital video image corresponding to one eye.

In this particular embodiment of the present invention each imaging sensor 10 is a video camera set up to record 60 frames per second. Moreover, video cameras 10 are disposed horizontally, in parallel and 6.5 cm apart.

The whole horizontal widths of the digital video images obtained by each video camera 10 are selected. In other words, all the angular area 20 captured by each video camera 10 is selected to form the corresponding digital stereoscopic panoramic video.

In this particular example of the present invention, each video sensor 10 captures a digital video image covering an angular area 20 which has a horizontal width $w_1$ of 1,080 pixels, and corresponding to a first horizontal angle α of vision, of 90°.

The 3,240 remaining horizontal pixels (4,320−1,080=3,240) required to form the 360° stereoscopic panoramic video, are selected from the plurality of digital still images.

Given that the panoramic video to be obtained is (in this particular embodiment of the invention) a stereoscopic one, two different sets of digital still images are obtained for obtaining the panoramic stereoscopic video (one for each eye). One single imaging system 100 has been illustrated in the different steps of FIGS. 2a-n, but two different imaging systems 10 are used and the operation of each imaging system 100 is exactly the same.

In the embodiment of the invention shown in FIGS. 2a-n, each imaging system 100 is a video camera moved with a motor, in order to obtain a plurality of digital still images. More particularly, each imaging system 100 is exactly the same video camera 10 used to obtain digital video image corresponding to one eye. Nevertheless, imaging systems 10 and imaging systems 100 used in the process according to the invention to obtain, respectively, the digital video image(s) and the digital still images could be of different types.

In other words, in this particular example of the present invention, imaging systems 10 and imaging systems 100 are the same, a video camera. Two video cameras are used, one for the left eye and one for the right eye.

Each imaging system 100 captures a second horizontal angle β of vision which, in this case, is 90°. In addition, each imaging system 100 is mounted on a piece which is, in turn, connected to a single and common motor that makes said imaging system 100 rotate about a central point between the two imaging systems 100. Said rotation center is not the optical center of any of the imaging systems 100, so the rotation introduces parallax to the digital still images obtained thereby.

In order to improve the smoothness of the formed digital fractional video sequence as much as possible, one ray having a horizontal width of only 1 pixel can be selected from each of the set of adjacent fractional images. Consequently, in order to form the fixed background of the resulting 360° stereoscopic panoramic video, 3,240 different adjacent fractional images, are obtained. The rays selected from the whole set of adjacent fractional images taken with each image sensor 100, cover a total angle of 270° (360°−90°=270°).

The process applied to each imaging system 100 to obtain the corresponding plurality of digital still images, as well as to obtain the rays that will form the still background image is exactly the same, and is schematically showed in FIGS. 2a-n.

Imaging systems 100 are turned on, as well the motor, which rotates clockwise 360° in 54 seconds and stops exactly at the end of said 360° cycle (so each imaging system 100 is then at the initial position). However, the process of the present invention also contemplates the possibility of obtaining each plurality of digital still images by a counterclockwise rotation.

After the conclusion of said 360° cycle, each of the image sensors 100 has obtained a set of 3,240 adjacent fractional images, which, in addition to the 90° of the digital video image cover a total angle of 360°. One ray, having a horizontal width of 1 pixel, will be selected from each digital still image of each set to form a still background image having a horizontal width of 3,240 pixels and covering a horizontal angle of 270°.

The selection of rays is exactly the same for both sets (also described herein as pluralities) of digital still images. Consequently, this selection step will only be described once. Nevertheless, in this particular embodiment of the invention, the selection is actually performed twice, since two 360° panoramic videos should be formed, one for each eye.

The first selected ray 300a is taken from the first digital still image (shown in FIG. 2a). This first selected ray 300a is the column (having a width of one pixel) of the first image, which is immediately adjacent to the right edge of the digital video image, and out of the angle of vision covered by digital video image. That is, the one at that is its most right column, since the selection of rays is performed clockwise.

The first column of the still background image is then completed with the first selected ray 300a.

The second selected ray 300b is taken from the second digital still image (shown in FIG. 2b). This second selected ray 300b is the column (having a width of one pixel) of the second still image, which is adjacent the first selected ray 300a, and out of the angle of vision covered by the fractional video sequence. That is, the one at the right, since the selection of rays is performed clockwise.

The second column of the background part is then completed with the second selected ray 300b.

The following rays 300c to 300m are selected using exactly the same method described above.

The last ray 300n is selected from the last still image (i.e, the 3,240$^{th}$ image) and corresponds to the column (having a width of one pixel) of said last still image, that is its most left column, which is immediately adjacent to the left edge of digital video image, and out of the angle of vision covered by said digital video image.

In this particular embodiment of the invention each digital still image has a width of 1,080 pixels. The columns of pixels forming each digital still image of are numbered from 1 (most left column) to 1,080 (most right column).

Consequently, the first ray 300a is taken form the 1,080$^{th}$ column of the first digital still image and the last ray 300n is taken form the 1$^{st}$ column of the last digital still image. In other words, the selection of rays, in this particular embodiment of the invention, follows the following formula:

Ray $n$=Column(1,080−1079*$n$/3,239) of $n^{th}$ still image, where 0≤n≤3,239, (n=0 corresponds to the first ray 300a, n=1 corresponds to the second ray 300b, and so on), and in which the value of the column obtained is rounded to the nearest whole number.

What is claimed is:

1. An imaging system comprising
a first imaging system operable to obtain a digital video image having a first width and a height, the first width comprising $w_1$ pixels and a first horizontal viewing angle, the height comprising h pixels and a first vertical viewing angle;
a second imaging system operable to obtain a plurality of digital still images, each still image comprising a ray, the ray having a second width and substantially the same height as the digital video image, the second width comprising $w_2$ pixels, 1≤$w_2$≤50, and a second horizontal viewing angle; and
a storage device operable to record said digital video image and said plurality of digital still images, or a display device operable to display said digital video image and said plurality of digital still images;
wherein said second imaging system is aligned and operable to obtain a set of n rays on either or both sides of the first horizontal viewing angle, the set of rays forming one or two still background images adjacent horizontally to the digital video image, the background image(s) having substantially the same vertical viewing angle as the first vertical viewing angle, where the width of each still background image is $n \cdot w_2$ and each ray forms one vertical stripe of the still background image.

2. The imaging system of claim 1 wherein the set of rays forms one background image extending from one side of the digital video image to the other side of the digital video image such that a 360° panoramic image is produced, the 360° panoramic image comprising the digital video image and the one background image covering all angles not included in the first horizontal viewing angle.

3. The imaging system of claim 1 wherein the second imaging system is the same as the first imaging system.

4. The imaging system of claim 1 wherein the second imaging system is operable to obtain the set of rays forming the background image(s) as follows:
 a) taking a first digital still image, horizontally adjacent to a first edge of the digital video image,
 b) selecting a first ray from the first still image, said first ray having a width $w_2$, and corresponding to the area of the first still image which is immediately adjacent to said first edge of the digital video image, and out of the angle of vision covered by said digital video image;
 c) selecting a second ray from the second still image, said second ray having a width $w_2$, and corresponding to the area of the second still image which is immediately adjacent to the first ray and out of the angle of vision already covered by the first ray; and
 d) repeating step c) with the remaining digital still images, until a last ray is selected from the last digital still image, said last ray having a width $w_2$, and corresponding to the area of the last digital still image which is immediately adjacent to a second edge of the digital video image.

5. The imaging system of claim 1 further comprising a third imaging system substantially similar to the first imaging system but displaced horizontally by a distance d and a fourth imaging system substantially similar to the second imaging system but displaced horizontally by the same distance d such that stereoscopic panoramic images are recorded or displayed.

6. The imaging system of claim 1, wherein $w_2=1$.

7. A method for capturing panoramic video comprising
 capturing a first digital video image with a first imaging system, the digital video image having a first width and a height, the first width comprising $w_1$ pixels and a first horizontal viewing angle, the height comprising h pixels and a first vertical viewing angle;
 capturing a first plurality of digital still images with a second imaging system, each still image comprising a ray, the ray having a second width and substantially the same height as the first digital video image, the second width comprising $w_2$ pixels, $1 \le w_2 \le 50$, and a second horizontal viewing angle; and
 recording said first digital video image and said plurality of digital still images on a storage device, or displaying said digital video image and said first plurality of digital still images on a display device;
 wherein said digital still images comprise a set of n rays on either or both sides of the first horizontal viewing angle, the set of rays forming one or two still background images adjacent horizontally to the digital video image, the background image(s) having substantially the same vertical viewing angle as the first vertical viewing angle, where the width of each still background image is $n \cdot w_2$ and each ray forms one vertical stripe of the still background image.

8. The method of claim 7 wherein the set of rays forms one background image extending from one side of the first digital video image to the other side of the first digital video image such that a 360° panoramic image is produced, the 360° panoramic image comprising the first digital video image and the one background image covering all angles not included in the first horizontal viewing angle.

9. The method of claim 7 wherein the plurality of digital still images are captured by the first video camera.

10. The method of claim 7 wherein the rays forming the background image(s) are obtained following these steps:
 a) taking a first digital still image, horizontally adjacent to a first edge of the digital video image,
 b) selecting a first ray from the first still image, said first ray having a width $w_2$, and corresponding to the area of the first still image which is immediately adjacent to said first edge of the digital video image, and out of the angle of vision covered by said digital video image;
 c) selecting a second ray from the second still image, said second ray having a width $w_2$, and corresponding to the area of the second still image which is immediately adjacent to the first ray and out of the angle of vision already covered by the first ray; and
 d) repeating step c) with the remaining digital still images, until a last ray is selected from the last digital still image, said last ray having a width $w_2$, and corresponding to the area of the last digital still image which is immediately adjacent to a second edge of the digital video image.

11. The method of claim 7 further comprising capturing a second digital video image with a third imaging system, substantially similar to the first digital video image but displaced horizontally by a distance d and capturing a second plurality of digital still images with a fourth imaging system substantially similar to the first plurality of digital still images but displaced horizontally by the same distance d such that stereoscopic panoramic images are recorded or displayed.

12. The method of claim 7, wherein $w_2=1$.

13. The method of claim 7, wherein the first plurality of digital still images is captured before the first digital video image.

14. The method of claim 7, wherein the first plurality of digital still images is captured after the first digital video image.

15. The method of claim 7, wherein the panoramic video represents an equirectangular projection of a scene.

16. The method of claim 7, wherein the panoramic video represents a cylindrical projection of a scene.

* * * * *